United States Patent [19]
Wright et al.

[11] Patent Number: 5,186,492
[45] Date of Patent: Feb. 16, 1993

[54] AIR BAG MODULE

[75] Inventors: Eric W. Wright, Warren; Mark T. Lecznar, Dearborn Hts.; Thomas J. Klena, II, Troy, all of Mich.

[73] Assignee: TRW Vehicle Safety Systems, Inc., Lyndhurst, Ohio

[21] Appl. No.: 743,167

[22] Filed: Aug. 8, 1991

[51] Int. Cl.$^5$ .............................................. B60R 21/20
[52] U.S. Cl. .................................... 280/743; 280/732; 280/731
[58] Field of Search ................ 280/731, 732, 743, 728

[56] References Cited

U.S. PATENT DOCUMENTS

| | | | |
|---|---|---|---|
| 3,767,225 | 10/1973 | Mazelsky | 280/729 |
| 3,934,984 | 1/1976 | Marlow et al. | 23/281 |
| 3,938,826 | 2/1976 | Giorgini et al. | 280/738 |
| 3,944,250 | 3/1976 | Wulf et al. | 280/732 |
| 4,111,457 | 9/1978 | Kob et al. | 280/728 |
| 4,793,631 | 12/1988 | Takada | 280/743 |
| 4,810,005 | 3/1989 | Fohl | 280/732 |
| 4,842,300 | 6/1989 | Ziomak et al. | 280/732 |
| 4,915,410 | 4/1990 | Bachelder | 280/743 |
| 4,964,654 | 10/1990 | Bishop et al. | 280/743 |
| 4,986,569 | 1/1991 | Bruton | 280/743 |

FOREIGN PATENT DOCUMENTS 9014749 3/1991 Fed. Rep. of Germany.

Primary Examiner—Kenneth R. Rice
Attorney, Agent, or Firm—Calfee, Halter & Griswold

[57] ABSTRACT

A vehicle air bag module comprises a container, a folded air bag disposed substantially inside the container, and an inflator coupled to the container. The container comprises a reaction device and a cover fastened to the reaction device. A retainer frame is located outside the container. A segment of the air bag material is disposed between the cover and the reaction device, and is connected to the retainer frame. The segment of the air bag is captured between the cover and the reaction device as the cover and reaction device are fastened together. Thus, the same structure which fastens the cover to the reaction device also fastens the air bag to the container. Since the retainer is disposed outside of the container, the volume of the container is relatively small, and the module is relatively compact. Also, the retainer is preferably a continuous frame which is drawn into force transmitting relation with the reaction device during deployment of the air bag, to anchor the air bag securely to the reaction device during deployment of the air bag.

13 Claims, 6 Drawing Sheets

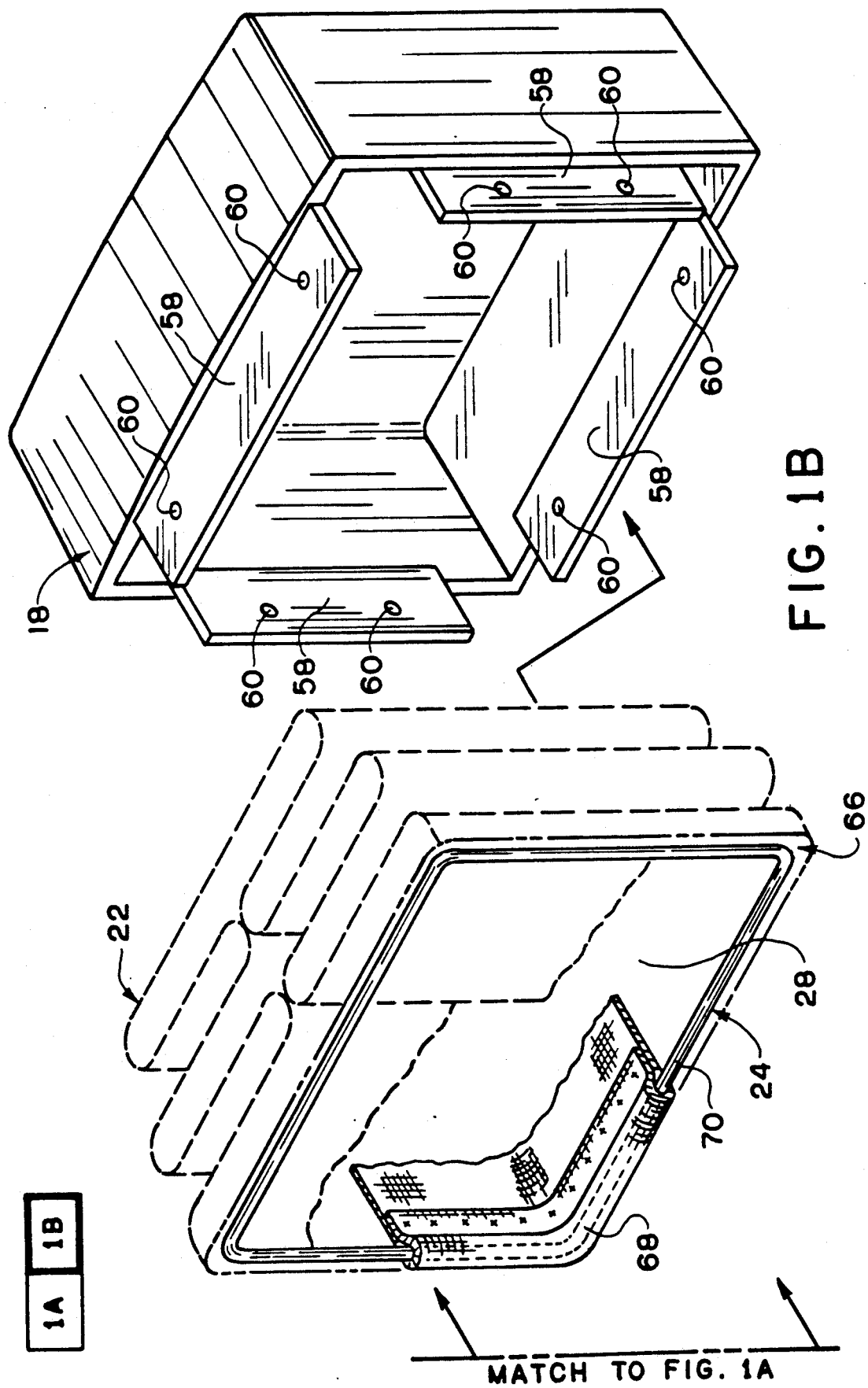

AIR BAG MODULE

TECHNICAL FIELD

The present invention relates to an air bag module which is designed to be compact, simple in construction, efficient to assemble, and formed of relatively few parts.

BACKGROUND

A typical vehicle air bag module comprises a folded air bag disposed inside a container, and an inflator (or gas generator) connected with the container. The vehicle air bag module is normally assembled outside the vehicle, and loaded as a complete unit into the vehicle. At the onset of a collision, the inflator is actuated and rapidly discharges an inert, non-toxic gas (e.g., nitrogen). The gas is directed into the air bag, forces the air bag out of the container, and rapidly inflates the air bag to cushion a vehicle occupant against impact with a structural part of the vehicle.

It is well known to provide a relatively strong structural member (referred to herein as a "reaction device") as a part of the container. The reaction device may comprise a reaction can (see e.g., U.S. Pat. No. 4,842,300) or a reaction plate (see e.g., U.S. Pat. No. 4,915,410). Generally, the air bag and the inflator are anchored to the reaction device, and the reaction device is connected to a structural part of the vehicle. During deployment of an air bag, the reaction device takes up forces from the air bag and the inflator, and transmits at least part of those forces to the structural part of the vehicle. Thus, the inflator and the air bag remain anchored to the reaction device as the air bag is being deployed.

In the construction of an air bag module, it is desirable to make the module as compact as possible, to fit in the limited space available within a vehicle. For example, a driver side air bag module, which is designed to be incorporated into the steering wheel of a vehicle, must be particularly compact so as to fit the limited space available in the steering wheel. Further, there is a continuing need to provide air bag modules which are formed of relatively few parts, which are simple in construction, and economical and efficient to produce and assemble.

SUMMARY OF THE INVENTION

The present invention provides a new and useful air bag module which is designed to be compact, simple in construction, efficient to assemble, and formed of relatively few parts.

The module comprises a container, a folded air bag disposed substantially inside the container, and an inflator coupled to the container. The container comprises a reaction device and a cover fastened to the reaction device. A retainer frame is located outside the container. A segment of the air bag material is disposed between the cover and the reaction device, and is connected to the retainer frame. The segment of the air bag is captured between the cover and the reaction device as the cover and reaction device are fastened together. Thus, the same structure which fastens the cover to the reaction device also fastens the air bag to the container. This provides a simple and efficient way for fastening the air bag with the container, and enables the air bag to be preassembled into the container using relatively few parts.

Since the retainer member is disposed outside the container, the volume of the container is relatively small, and the module is relatively compact. Also, the retainer member is preferably a continuous frame which is drawn into force transmitting relation with a portion of the reaction device during deployment of the air bag, to anchor the air bag securely to the reaction device during deployment of the air bag.

Further, according to the preferred embodiment, the continuous frame is incorporated into one or more fabric tubes formed in the air bag material. The fabric tube(s) are formed at the mouth of the air bag, and a segment of the air bag fabric extends from the fabric tube into the container. That segment of the air bag fabric is captured between the cover and reaction device as the cover and the reaction device are coupled together.

The reaction device preferably comprises a reaction plate with flanges formed in one piece with the reaction plate. The flanges are adapted to be fastened to corresponding portions of the cover, preferably by bolts or rivets. The reaction structure preferably comprises distal end surfaces of the flanges. The dimension of the continuous frame is such that the continuous frame and the surrounding fabric tubes of the air bag are drawn into force transmitting relation with the distal end surfaces of the flanges during deployment of the air bag. Hence, the retainer frame retains the air bag anchored to the reaction device during deployment of the air bag.

Furthermore, in accordance with the principles of U.S. Pat. No. 4,915,410, the reaction plate is adapted so that the inflator can be attached to the reaction plate after the container has been preassembled with the folded air bag therein. Thus, the inflator can be assembled, transported and stored separate from the preassembled air bag container. Assembly of the inflator with the preassembled air bag container can take place whenever it is desired to complete the module.

Other features of the present invention will become apparent from the following description and accompanying drawings.

BRIEF DESCRIPTION OF THE DRAWINGS

FIGS. 1A and 1B taken together show an exploded view of the principal components which are assembled to form an air bag module, according to the principles of the present invention;

DETAILED DESCRIPTION OF THE PREFERRED EMBODIMENT

Figure 1A:
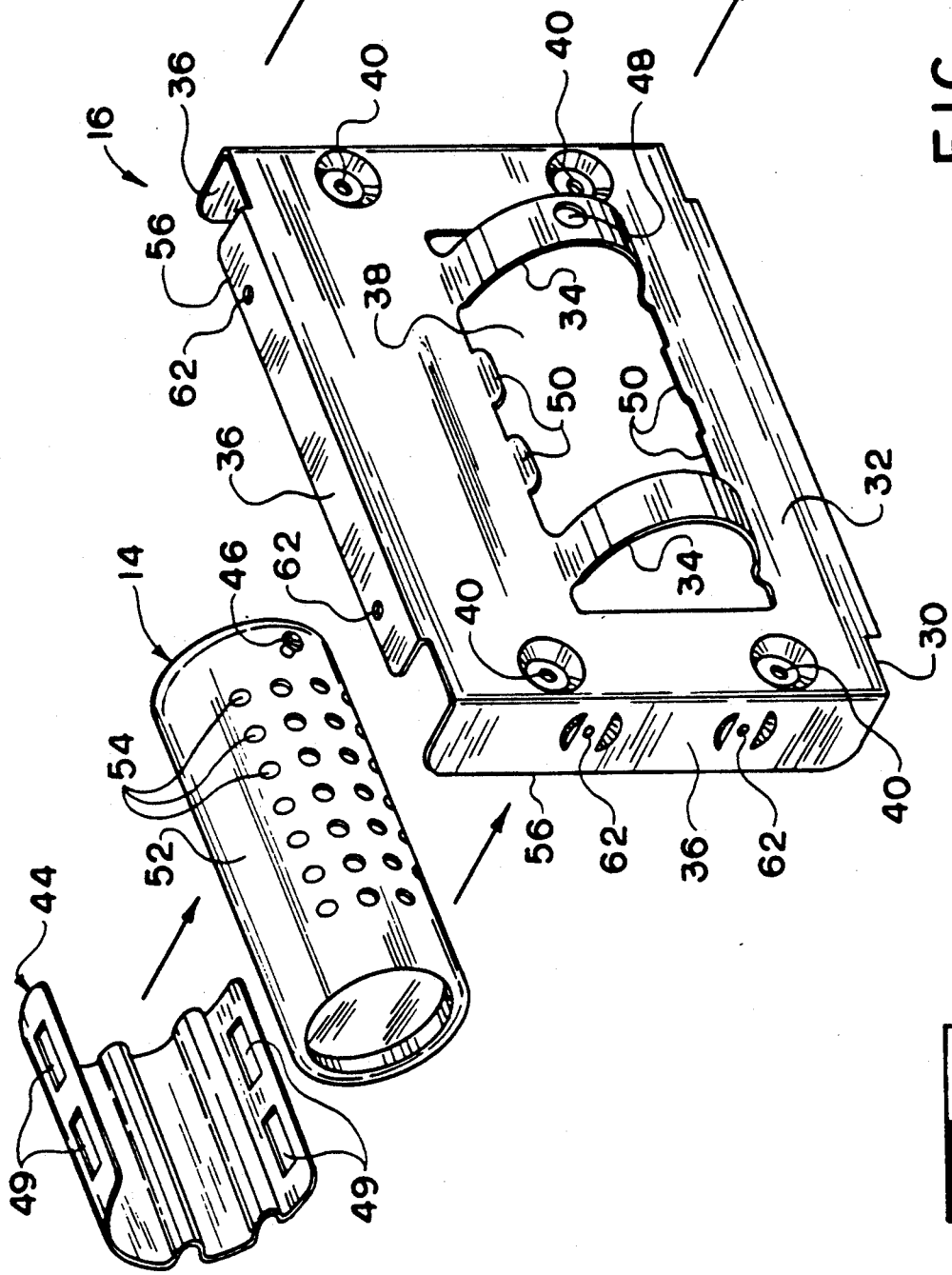
Figure 2:
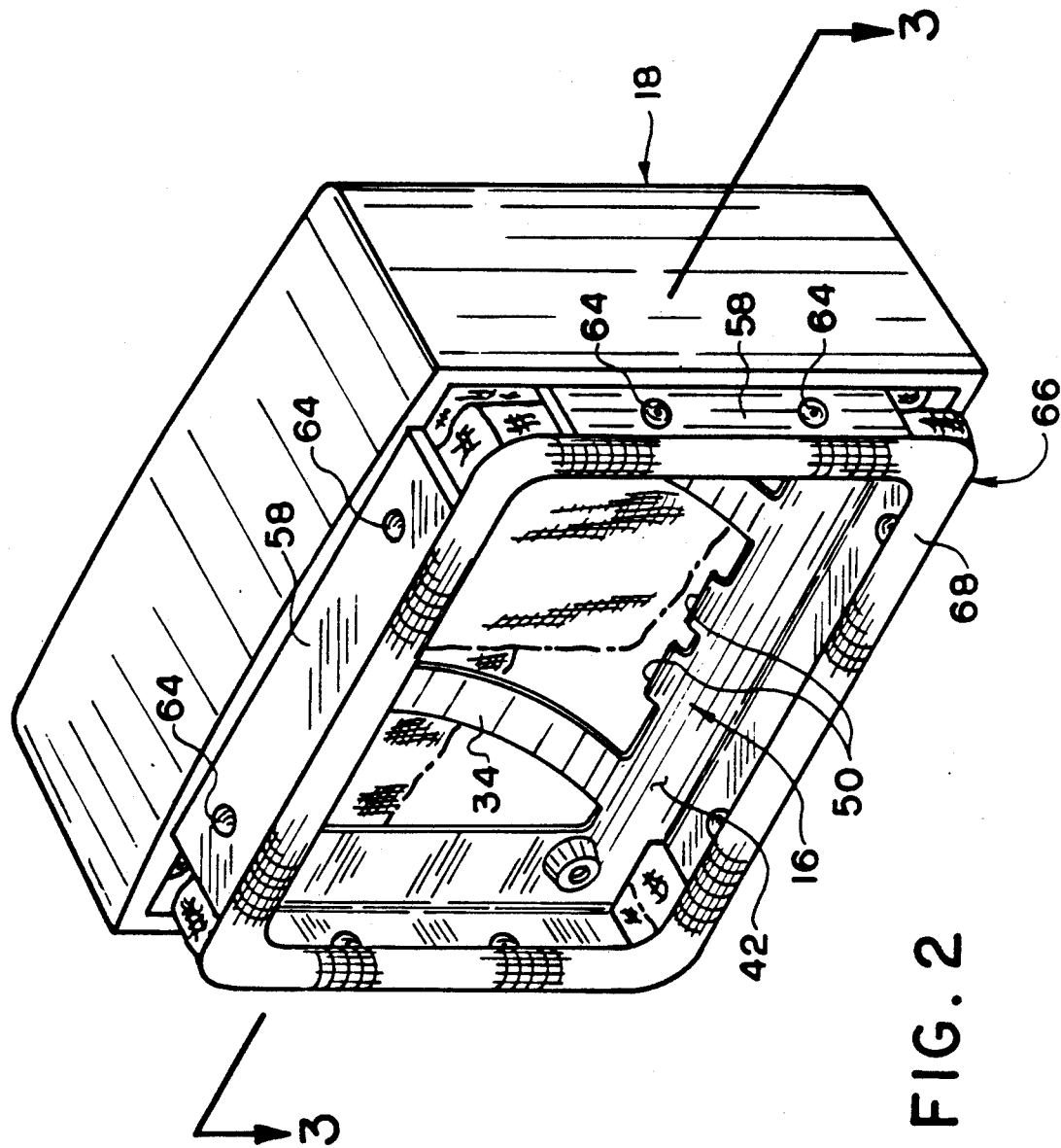
FIG. 2 is a perspective view of a preassembled air bag container according to the invention, taken at an angle to the rear side thereof.
Figure 3:
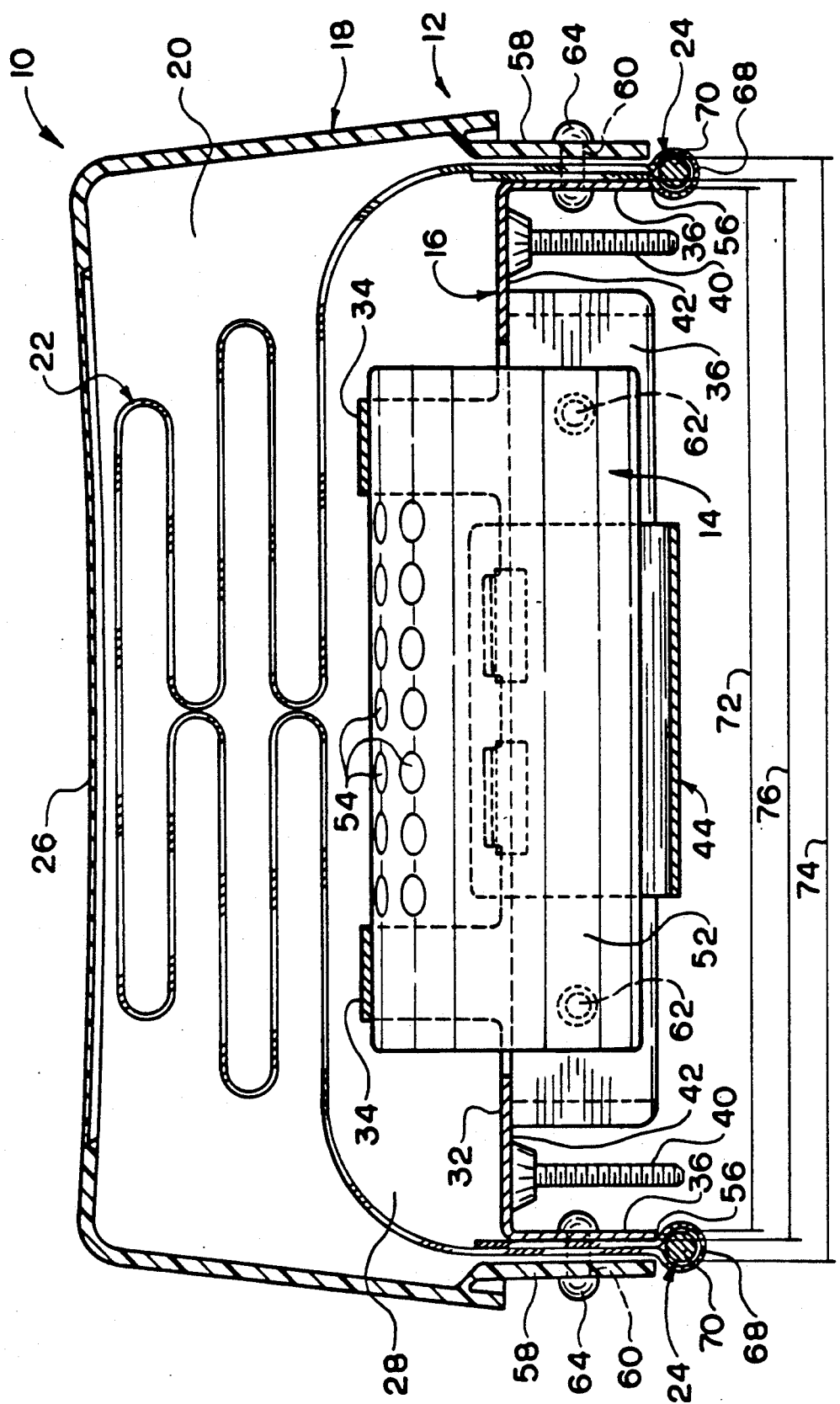
FIG. 3 is a sectional view of an air bag module, constructed according to the present invention and taken from the direction 3—3 in FIG. 2.

Referring to the embodiment of FIGS. 1-3, an air bag module 10 comprises an air bag container 12 and a cylindrical inflator 14 secured to the air bag container 12 (see FIG. 3). The air bag container 12 comprises a reaction plate 16 and a cover 18 fastened to the reaction plate 16. The air bag container 12 defines an internal cavity 20. A folded, inflatable air bag 22 is disposed substantially in the internal cavity 20. A portion of the material of the air bag 22 is disposed between the cover 18 and the reaction plate 16, and is secured to a retainer frame 24 located outside of the air bag container 12 (see FIGS. 1 and 2). The inflator 14 is attached to the air bag container 12 after the container has been preassembled, with the folded air bag 22 disposed in it. Attachment of the inflator to the preassembled air bag container 12 completes the air bag module 10.

The cover 18 is preferably made of a tough, flexible plastic material (e.g., polyethylene) which is typically used to mold vehicle dashboards. One suitable plastic material is sold by General Electric Company of Schenectady, N.Y., under the trade name "Ultem". The inside of the cover 18 has internal score lines 26 disposed in a predetermined configuration, to selectively weaken the cover 18 at predetermined locations. At the onset of a collision, the inflator 14 rapidly discharges an inert, non-toxic gas (e.g., nitrogen) and directs the gas into an interior cavity 28 in the air bag 22. The weakened portions of the cover 18 enable the cover 18 to separate at the predetermined locations to enable the air bag 22 to be forced through the cover 18 and inflated to a predetermined configuration in front of a vehicle occupant.

The reaction device 16 comprises a reaction plate 30 formed of sheet steel. The reaction plate 30 comprises a planar main body 32, a pair of spaced apart, arcuate bands 34 formed in one piece with the planar main body, and a series of flanges 36 also formed in one piece with the planar main body 32. A central opening 38 is formed in the planar main body 32, and extends between the arcuate bands 34. The flanges 36 are formed at the perimeter of the planar main body 32, and extend substantially perpendicular to the planar main body 32. Four threaded shafts 40 are integrally connected to and extend away from the main body 32. When the reaction plate 30 is incorporated into the air bag container 12, a surface 42 of the main body 32 forms an outside wall of the air bag container 12. The flanges 36 and the threaded shafts 40 extend rearward away from the external wall 42 of the air bag container 12. The threaded shafts 40 are used to couple a completed air bag module 10 to a structural part of a vehicle.

The arcuate bands 34 form a cradle for receiving the cylindrical inflator 14. A flexible, resilient clip 44, formed of spring steel, is used to secure the inflator 14 in the cradle formed by the arcuate bands 34. Specifically, the inflator 14 has an integrally formed locator pin 46 which mates with a hole 48 formed in one of the arcuate bands 34 to align the inflator 14 properly in the cradle. When the inflator is properly aligned in the cradle, the spring clip 44 can be flexed to enable the spring to engage tabs 50 formed in one piece with the main body 32 to secure the spring clip 44 to the reaction plate 30.

The inflator 14 has a cylindrical outer housing 52. The cylindrical outer housing 52 has a plurality of gas dispensing nozzles 54 for rapidly directing gas from the inflator 14 when the inflator is actuated. An inert, non-toxic gas (e.g., nitrogen) is discharged from the inflator upon either the release of a quantity of the gas stored under pressure in the housing 52 or the ignition of a solid, gas generant disposed within the housing 52. The internal structure of the inflator 14 can be of a number of well known constructions. When the inflator 14 is properly aligned in the cradle formed by the arcuate bands 34, the nozzles 54 in the inflator housing 52 will be aligned with the central opening 38 in the main body 32 to direct gas discharged by the inflator 14 through the central opening 38 and into the internal cavity 28 of the air bag 22.

The flanges 36 at the perimeter of the planar main body 32 are adapted to enable the cover 18 to be secured to the reaction plate 30, as described more fully hereinafter. Moreover, the flanges 36 have distal end surfaces 56 which form reaction structure for maintaining the air bag 22 anchored to the reaction plate 30 during deployment of the air bag, as also described more fully hereinafter.

The cover 18 is a substantially cup-shaped member. Four flanges 58 are formed in one piece with the border of cover 18. The border flanges 58 of the cover are dimensioned to fit tightly about the flanges 36 at the outer perimeter of the reaction plate. Formed in the border flanges 58 on the cover 18 and the flanges 36 on the reaction plate are rivet holes 60, 62, respectively. The rivet holes 60 and 62 can be aligned with each other to enable rivets 64 (FIG. 3) or other fasteners to be driven through the aligned holes to fasten the cover 18 securely with the reaction plate 30.

The air bag 22 is a substantially continuous fabric member formed of a strong, durable fabric, such as nylon. The air bag 22 has a mouth 66 that defines an inlet opening through which gas is communicated with the interior cavity 28 in the air bag. The air bag fabric is formed into a tube 68 at the mouth 66 of the air bag. The tube 68 is formed by looping fabric at the mouth 66 of the air bag back on itself to form a double layer of the fabric material.

The retainer frame 24 comprises a continuous frame member 70 adapted to be disposed inside the fabric tube member 68. The continuous frame member 70 can be metal, nylon or other material of comparable strength. The continuous frame member 70 has a generally rectangular inner perimeter 72 and a generally rectangular outer perimeter 74 (FIG. 3). The inner perimeter 72 is dimensioned to be smaller than the outer perimeter 76 of the rectangular shape defined by the flanges 36 formed on the reaction device (see FIG. 3). In addition, the distance across the frame member 70 between opposed portions of the frame member is smaller than the distance between outward facing surfaces of opposed flanges 36.

In assembling the air bag container 12, the continuous frame member 70 is disposed in the fabric tube 68 at the mouth 66 of the air bag 22. The double layer of the air bag fabric which forms the tube 68 is captured between the border flanges 58 on the cover and the flanges 36 on the reaction plate 30 as the flanges are riveted to each other. The double layer of air bag fabric may have openings (not shown) which can be aligned with the holes 60, 62 in the flanges on the reaction plate and the cover. Thus, the same rivets 64 which attach the cover 18 and the reaction plate 30 also fasten the double layer segment of the air bag between the cover and reaction plate.

The continuous frame member 70 may be incorporated into the fabric tube 68 before the air bag is coupled to the container 12, or simultaneously as the air bag is being coupled to the container. At least two methods are contemplated for incorporating the frame member 70 into the tube 68 prior to coupling the air bag with the container. Specifically, the fabric tube 68 can be preformed about the continuous frame member 70 and the double layer of fabric sewn together to complete the tube 68. The fabric tube 68, together with the continuous frame member 70, can then be forced over the reaction plate 30 until the continuous frame member 70 snaps behind the flanges 36. The flanges 36 on the reaction plate have some flexibility to enable the fabric tube and continuous frame member 70 to be forced over the reaction plate 30 and the flanges 36. The junctions of the flanges 36 and the planar main body 32, and the distal ends 56 of the flanges 36 have rounded profiles to avoid sharp corners which might tear the fabric of the bag.

Another method of incorporating the frame member 70 into the tube 68 prior to coupling the air bag with the container involves initially locating the continuous frame member 70 adjacent the distal ends 56 of the flanges 36. The fabric tube 68 can then be formed about the continuous frame member 70, and the double layers of bag fabric sewn together to complete the tube 68. With either of these above techniques, the double layer of bag adjacent the fabric tube 68 is disposed between the flanges 58 on the cover 18 and the flanges 36 on the reaction plate 30, and is fastened intermediate those flanges as the flanges are fastened together. Also, with either assembly, the remainder of the air bag 22 (which is designed to be located in the internal cavity 20 in the container) can be prefolded to a predetermined folded configuration.

The continuous frame member 70 may alternatively be incorporated into the fabric tube 68 simultaneously as the air bag is being coupled to the container. Specifically, the air bag 22 is initially prefolded into a predetermined configuration which corresponds to the dimensions of the internal cavity 20 of the cover 18. The prefolded air bag is installed over the reaction plate 30 so that the perimeter of the bag mouth extends beyond the distal ends 56 of the flanges 36 by at least the desired width of the tube 68. The continuous frame member 70 is then positioned on the outside of the bag material adjacent the distal ends of the flanges. The tube 68 is formed by folding the fabric at the mouth of the bag over the frame member 70 to form a double layer of fabric. The double layer of fabric can then be captured intermediate the flanges 58 on the cover and the flanges 36 on the reaction plate without sewing the double layer of fabric together. By fastening the flanges on the cover and the reaction plate together, the continuous frame member 70 is incorporated into the fabric tube 68 simultaneously as the air bag is being coupled to the container.

The air bag container 12 can be formed as a subassembly which can be transported and stored separate from the inflator 14, and then assembled with the inflator 14 as the final step of assembling the module 10. According to the embodiment of FIGS. 1–3, the inflator 14 is coupled with the reaction plate 30 by means of the spring clip 44. The inflator 14 can be coupled with the reaction plate 30 at any convenient time before installation of the module in a vehicle.

Figure 4:
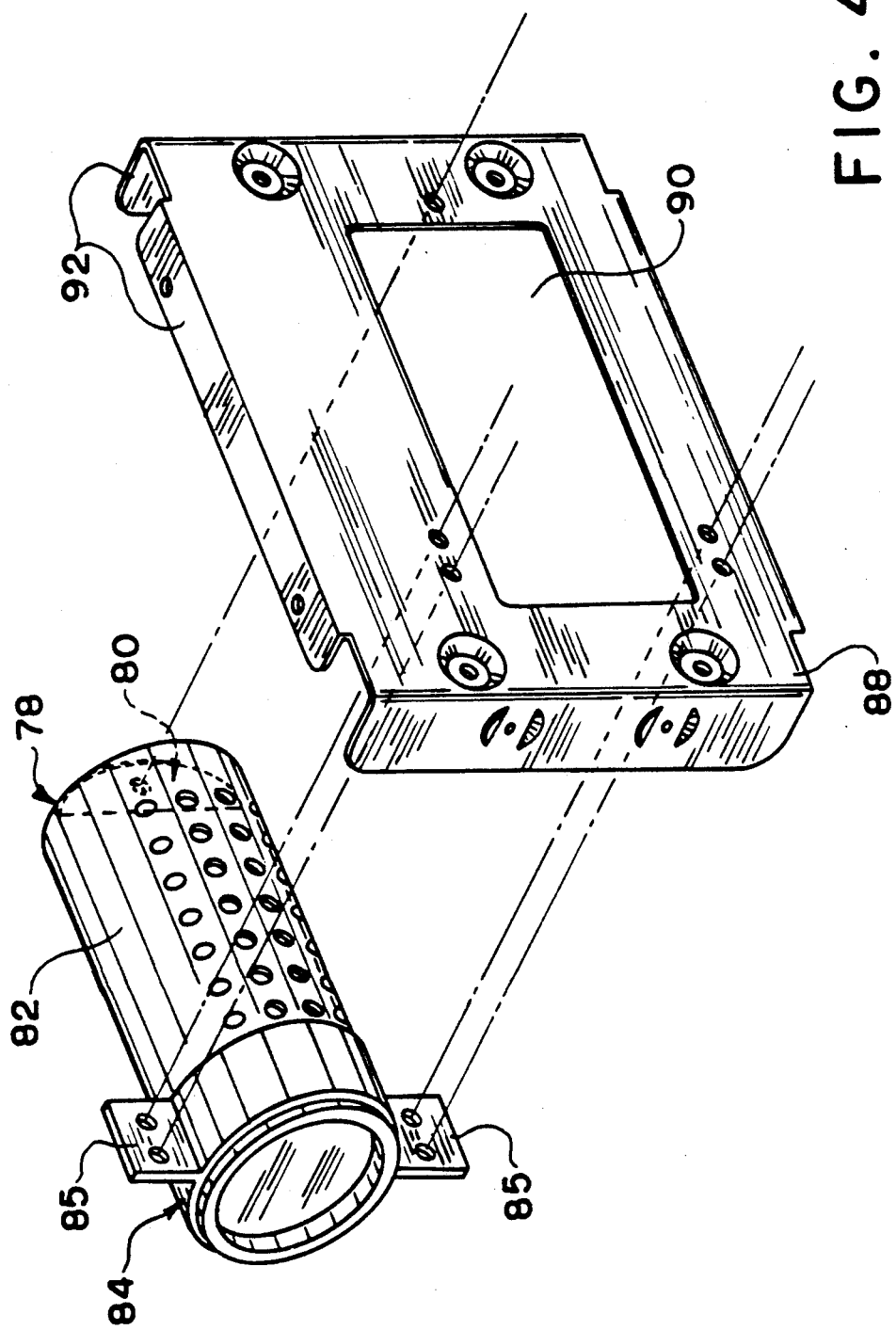
FIG. 4 is an exploded view of an inflator and reaction device for a module according to a modified form of the present invention.
Figure 5:
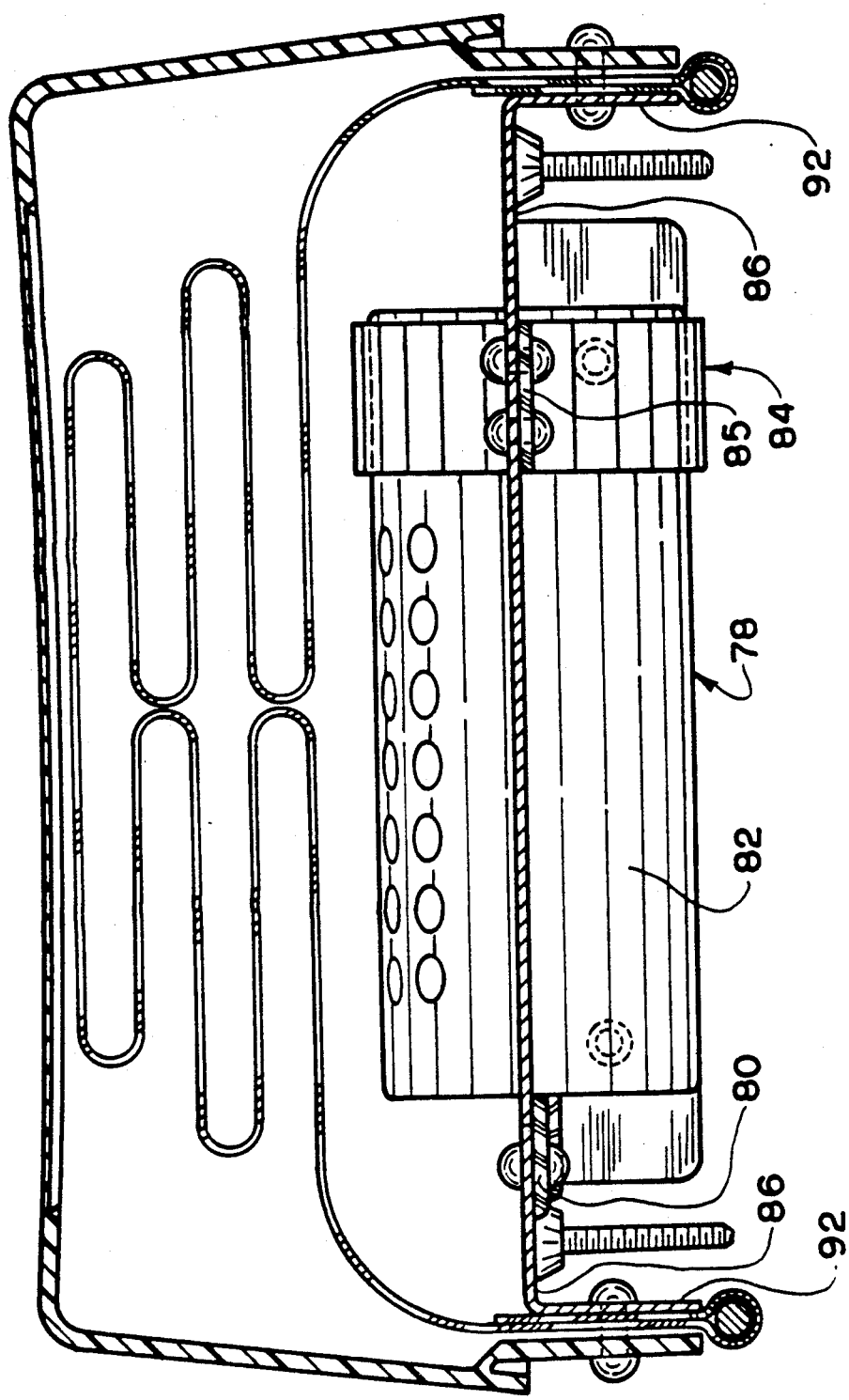
FIG. 5 is a sectional view, similar to FIG. 3, of an air bag module according to the modified form of the present invention.

An alternative structure for coupling an inflator to the reaction plate of an air bag module is shown in FIGS. 4 and 5. A reaction device comprises a reaction plate 88 with a central opening 90 and a series of flanges 92, both of which are similar to the previous embodiment. An inflator 78 has an integral tongue 80 formed at one end of the inflator housing 82 and a flanged sleeve 84 secured to the other end of the inflator housing. The tongue 80 and a pair of flanges 85 on the sleeve 84 are adapted to be located against and bolted or riveted to an outside wall 86 of the reaction plate 88 to couple the inflator 78 to the reaction plate 88.

With the air bag module structure of the invention, the air bag container can be particularly compact, because the container encompasses only the folded part of the air bag. Moreover, the module is simple and efficient to assemble by the techniques described above. Additionally, with the foregoing module structure, the air bag is securely anchored to the reaction plate during inflation. Specifically, during deployment of the air bag, the continuous frame member is forced toward the distal end surface of the flange of the reaction plate. Because the internal perimeter of the continuous frame member is smaller than the outer perimeter of the reaction plate, the continuous frame member (with the fabric tube of bag thereabout) is forced against the reaction surface as the air bag is being deployed. Accordingly, the air bag remains securely anchored to the reaction device during deployment of the air bag.

While the preferred embodiment of the invention has been described in detail, it should be apparent that the invention can be incorporated into air bag modules of other materials, constructions, and designs, that such additional modifications will be apparent to those of ordinary skill in the art, and that it is intended to cover all devices incorporating the present invention as defined by the appended claims.

What is claimed is:

1. Apparatus for use in forming an air bag module, comprising:

a reaction device and a cover fastened to each other and forming a container with an internal cavity, said reaction device forming reaction structure on an exterior portion of said container;

an inflatable air bag disposed substantially in said internal cavity in said container, said inflatable air bag being adapted to be forced through said cover and out of said container when gas under pressure is directed into said air bag; and a retainer member located outside of said container, said retainer member being connected with said air bag;

said retainer member being located so as to be drawn into force transmitting relationship with said reaction structure on said reaction device as said inflatable air bag is being forced out of said container, to maintain said air bag anchored to said reaction device as said inflatable air bag is being forced out of said container;

wherein said reaction device and said cover have respective portions which are fastened to each other in forming said container, and wherein a segment of said flexible bag is disposed and captured between said respective portions of said reaction device and said cover, said apparatus further comprising means for fastening together said respective portions of said reaction device and said cover and also maintaining said segment of said flexible bag between said respective portions of said reaction device and said cover.

2. An apparatus as set forth in claim 1 wherein said retainer frame comprises a continuous frame.

3. Apparatus for use in forming an air bag module, comprising:

a reaction device and a cover fastened to each other and forming a container with an internal cavity, said reaction device forming reaction structure on an exterior portion of said container;

an inflatable air bag disposed substantially in said internal cavity in said container, said inflatable air bag being adapted to be forced through said cover and out of said container when gas under pressure is directed into said air bag; and a retainer member located outside of said container, said retainer member being connected with said air bag;

said retainer member being located so as to be drawn into force transmitting relationship with said reaction structure on said reaction device as said inflatable air bag is being forced out of said container, to maintain said air bag anchored to said reaction device as said inflatable air bag is being forced out of said container;

wherein said retainer member comprises a continuous frame member.

4. Apparatus as set forth in claim 3, wherein said inflatable air bag comprises a flexible bag with an interior cavity and a mouth defining an opening in said flexible bag, said continuous frame member being received in a tube formed by material of said flexible bag at said mouth of said air bag.

5. Apparatus as set forth in claim 3, wherein said continuous frame member has an inner perimeter and an outer perimeter, said reaction structure of said reaction device having an outer perimeter which is greater than the inner perimeter of said continuous frame member.

6. Apparatus as set forth in claim 5, wherein said reaction device comprises a reaction plate and at least one flange formed on said reaction plate, said at least one flange being adapted to enable a border portion of said cover to be fastened thereto in forming said container, and at least part of said at least one flange having said reaction structure formed thereon.

7. Apparatus as set forth in claim 6, wherein said reaction plate comprises a substantially planar main body, and said at least one flange is formed in one piece with and extends substantially normal to said planar main body.

8. Apparatus as set forth in claim 7, wherein said reaction structure is formed at a distal end portion of said at least one flange.

9. Apparatus as defined in claim 8, wherein said cover has a border portion disposed outside of and in spaced, aligned relation to said at least one flange of said reaction device, and wherein said apparatus further comprises a series of fasteners extending through said border portion of said cover and said at least one flange of said reaction device and urging said border portion of said cover and said at least one flange of said reaction device toward each other, a segment of said flexible bag being disposed between said border portion of the said cover and said at least one flange of said reaction device, said fasteners extending through said segment of said flexible bag to maintain said segment of said flexible bag secured between said border portion of said cover and said flange structure of said reaction device.

10. Apparatus as set forth in any of claims 7-9, further comprising an inflator coupled to said main body of said reaction plate, said inflator comprising a housing enclosing a source of gas, said housing having gas dispensing nozzles for directing gas discharged from said inflator into the interior cavity of said air bag.

11. Apparatus as set forth in claim 10, wherein a central opening is formed in said reaction plate, said inflator housing being disposed partially in said central opening in said reaction plate with the gas dispensing nozzles of the inflator housing directed toward the internal cavity of said container.

12. Apparatus as set forth in claim 11, wherein said mouth of said air bag substantially surrounds said planar main body of said reaction device.

13. Apparatus for use in forming an air bag module, comprising:

a reaction device and a cover fastened to each other and forming a container with an internal cavity, said reaction device forming reaction structure on an exterior portion of said container;

an inflatable air bag disposed substantially in said internal cavity in said container, said inflatable air bag being adapted to be forced through said cover and out of said container when gas under pressure is directed into said air bag; and a retainer frame located outside of said container, said retainer frame being connected with said air bag;

said retainer frame being located so as to be drawn into force transmitting relationship with said reaction structure on said reaction device as said inflatable air bag is being forced out of said container, to maintain said air bag anchored to said reaction device as said inflatable air bag is being forced out of said container.

* * * * *